United States Patent [19]

Martin

[11] 4,289,867
[45] Sep. 15, 1981

[54] ORGANOFUNCTIONAL POLYSILOXANE POLYMERS AND A METHOD FOR PREPARING THE SAME

[75] Inventor: Eugene R. Martin, Onsted, Mich.

[73] Assignee: SWS Silicones Corporation, Adrian, Mich.

[21] Appl. No.: 116,723

[22] Filed: Jan. 30, 1980

Related U.S. Application Data

[63] Continuation-in-part of Ser. No. 968,152, Dec. 11, 1978, abandoned.

[51] Int. Cl.³ .............................................. C08G 77/06
[52] U.S. Cl. .................................... 528/12; 528/14; 528/18; 528/21; 528/23; 528/30; 528/34; 556/427; 556/429
[58] Field of Search .................. 556/427, 429; 528/30, 528/34, 23, 14, 18, 21, 12

[56] References Cited

U.S. PATENT DOCUMENTS

| | | | |
|---|---|---|---|
| 3,794,672 | 2/1974 | Kim | 556/429 |
| 4,046,795 | 9/1977 | Martin | 556/429 |
| 4,133,939 | 1/1979 | Bokerman et al. | 528/30 |
| 4,230,816 | 10/1980 | Martin | 528/30 |

*Primary Examiner*—Melvyn I. Marquis

[57] ABSTRACT

This invention relates to sulfur containing polysiloxane polymers having units of the general formula $$(M)_x(T')_y$$

wherein M represents an $R_3SiO_{0.5}$ unit in which R is a monovalent hydrocarbon radical or a halogenated monovalent hydrocarbon radical having from 1 to 18 carbon atoms, T' represents a unit of the formula $$(R''S)_zR'SiO_{1.5}$$

in which R' is a divalent, trivalent or tetravalent hydrocarbon radical having from 2 to 18 carbon atoms or divalent, trivalent or tetravalent hydrocarbon radicals having at least one —C—S—C— group, R" is hydrogen or R, x and y each represent a number greater than 1 and up to 20,000, in which the ratio of x to y may vary from 1:0.33 to 0.005:1 and z is 1, 2 or 3.

These sulfur containing polysiloxane polymers are prepared by reacting in the presence of an acid catalyst a mixture containing (1) a hexaorganodisiloxane and (2) a silicon compound having the formula $$(R''S)_zR'Si(OR)_3$$

in which R, R' and R" are the same as above.

8 Claims, No Drawings

ORGANOFUNCTIONAL POLYSILOXANE POLYMERS AND A METHOD FOR PREPARING THE SAME

This application is a continuation-in-part of application Ser. No. 968,152 filed on Dec. 11, 1978 and now abandoned.

The present invention relates to polysiloxane polymers and more particularly to sulfur containing polysiloxane polymers and to a method for preparing the same.

BACKGROUND OF INVENTION

Polysiloxane polymers, especially polysiloxane polymers containing sulfur atoms are described in U.S. Pat. No. 4,046,795 to Martin, in which a disiloxane and/or a hydrocarbonoxy or hydroxy containing silane or siloxane is reacted with a cyclic trisiloxane in the presence of an acid catalyst, in which at least one of the above organosilicon compounds contain an $R'(SR''')_y$ group, in which $R'$ is a divalent, trivalent or tetravalent hydrocarbon radical, $R'''$ is hydrogen or a monovalent hydrocarbon radical and y is a number of from 1 to 3. The resultant polysiloxane polymers contain MDT' structural units in which M represents an $R_3SiO_{0.5}$ unit, D represents an $R_2SiO$ unit and T' represents a unit of the formula $(R'''S)_yR'SiO_{1.5}$, in which R, R' and R''' are the same as above.

Compared to the polysiloxane polymers described in the above patent, the polysiloxane polymers of the present invention contain $(M)_x(T')_y$ structural units instead of the MDT' units. Polysiloxane polymers which are free of the "D" units have certain advantages over polysiloxanes containing "D" units. For example, the polysiloxanes of this invention which are free of the "D" units are more compatible with organic compounds while retaining some of the silicon compound characteristics. Moreover, the polysiloxane polymers of this invention may be reacted with cyclic siloxanes such as octaorganocyclotetrasiloxanes to form polysiloxane polymers containing "D" units.

Also, U.S. Pat. No. 3,794,672 to Kim describes perfluoroalkyl silicon compounds containing sulfur which are prepared by reacting olefins of the formula $R_fCH=CH_2$ with a silicon compound of the formula $$HSR\ Si\ X_m O_{\frac{3-n-m}{2}}$$

in the presence of free radical generators, such as peroxides, in which $R_f$ is a perfluoroalkyl radical, R is an alkylene radical, X is chlorine, acetoxy or an alkoxy radical, n is 0 to 2, and m is 0 to 3 and the sum of n+m is not greater than 3.

In contrast to the teachings of Kim, it has been found that polysiloxane polymers having $(M)_x(T')_y$ structural units can be prepared by reacting a disiloxane with a mercapto- or thiofunctional trihydrocarbonoxysilane.

Therefore, it is an object of the present invention to provide polysiloxane polymers which are more compatible with organic compounds while retaining some of the characteristics of the silicon compounds. Another object of this invention is to provide polysiloxane polymers which are free of the "D"$(R_2SiO)$ units. Still another object of this invention is to provide polysiloxane polymers which may be used as crosslinking agents in free-radical polymerizations. A further object of this invention is to provide a method for preparing polysiloxane polymers which are free of "D" $(R_2SiO)$ units.

SUMMARY OF INVENTION

The foregoing objects and others which will become apparent from the following description are accomplished in accordance with this invention, generally speaking, by providing polysiloxane polymers having the structural units $(M)_x(T')_y$ in which M represents an $R_3SiO_{0.5}$ unit and T' represents a unit of the formula $(R''S)_zR'SiO_{1.5}$ in which R is a monovalent hydrocarbon radical or a halogenated monovalent hydrocarbon radical having from 1 to 18 carbon atoms and R' represents a divalent, trivalent or tetravalent hydrocarbon radical having from 2 to 18 carbon atoms or divalent, trivalent or tetravalent hydrocarbon radicals having at least one —C—S—C— group and R'' is hydrogen or R, x and y are numbers each greater than 1 and up to 20,000, in which the ratio of x to y may vary from 1:0.33 to 0.005:1 and z is 1, 2 or 3.

The polysiloxane polymers which have units of the formula $$[(R''S)_zR'SiO_{1.5}]_x\ (O_{0.5}SiR_3)_y$$

are prepared by reacting (1) a disiloxane with a silicon compound of the formula $$(R''S)_zR'Si(OR)_3$$

in which R, R', R'', x, y and z are the same as above, in the presence of an acid catalyst.

DETAILED DESCRIPTION OF INVENTION

Examples of hydrocarbon radicals represented by R above are alkyl radicals, such as methyl, ethyl, propyl, butyl, octyl, decyl, dodecyl and octadecy radicals; aryl radicals, such as phenyl and naphthyl radicals; cycloalkyl radicals, such as cyclopentyl, cyclohexyl and cycloheptyl radicals; aralkyl radicals, such as benzyl, phenylethyl, phenylpropyl and phenylbutyl radicals; alkaryl radicals, such as tolyl, xylyl and ethylphenyl radicals; halogenated hydrocarbon radicals such as haloalkyl and haloaryl radicals, e.g., chloromethyl, chloroethyl, chlorobutyl, chlorophenyl, tetrachlorophenyl and difluorophenyl radicals.

Examples of divalent radicals represented by R' are alkylene radicals, such as ethylene, trimethylene, hexamethylene, octamethylene, dodecylmethylene; arylene radicals, such as phenylene, biphenylene radicals and the corresponding alkylene and arylene radicals containing at least one C—S—C unit.

Suitable examples of trivalent and tetravalent hydrocarbon radicals represented by R' are those of the formula $\equiv CHCH_2-$, $\equiv CHCH_2CH_2-$, $\equiv CH(CH_2)_3-$, $\equiv CH(CH_2)_4-$, $\equiv CH(CH_2)_{17}-$,

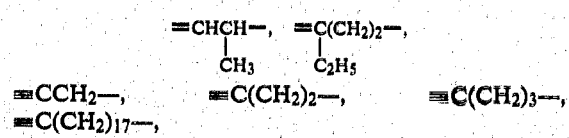

≡CCHCH₂—,   ≡CCH(CH₂)₂—
     |                |
    CH₃            C₂H₅ and the like.

Suitable examples of the group (R″S)$_z$R′— are —CH₂SH, —C₂H₄SH, —C₃H₆SH, —CH₂SC₄H₉, —C₂H₄SC₂H₅, —C₃H₆SC₆H₅, (HSCH₂)₂CHCH₂CH₂—, (HSCH₂)CH(CH₂)₄—, (HSCH₂)CH(CH₂)—, (HSCH₂CH₂) (HSCH₂CH₂) (HSCH₂CH₂)
(HSCH₂)CHCH(CH₂SH)SH₂CH₂CH₂—,
HS(CH₂)₅CH(CH₂CH₂SH)CH₂CH₂CH(CH₂CH₃)—,
(HSCH₂CH₂)₂CHCH₂CH₂—,
(HSCH₂)₂CHSCH₂CH₂CH₂—,
(HSCH₂)₂(C₂H₅)CCH₂SCH₂CH₂CH₂—,
(HSCH₂)₃CCH₂SCH₂CH₂CH₂—, (HSCH₂)
(HSCH₂CH₂CH₂CH₂)CHSCH₂CH₂CH₂—,
(HSCH₂CH₂)₂CHCH₂SCH₂CH₂CH₂—,
(HSCH₂)₂(C₂H₅)CCH₂SCH₂CH₂(CH₂)₃—,
(HSCH₂)₃CCH₂S(CH₂)₃S(CH₂)₃—, $$(HSCH_2)_2C(CH_3)CH_2\overset{S}{\overset{\|}{C}}SCH_2CH_2CH_2—,$$

$$(HSCH_2)_3CCH_2\overset{S}{\overset{\|}{C}}SCH_2CH_2CH_2—,$$

$$(HSCH_2)_2(C_2H_5)CCH_2S\overset{S}{\overset{\|}{C}}CH_2CH_2CH_2—,$$

$$(HSCH_2)_2(C_2H_5)CCH_2SCH_2CH(CH_3)\overset{O}{\overset{\|}{C}}OCH_2CH_2CH_2—,$$

$$(HSCH_2)_3CCH_2SCH_2CH(CH_3)\overset{O}{\overset{\|}{C}}OCH_2CH_2CH_2—,$$

$$—(CH_2)_3S(CH_2)_2\overset{O}{\overset{\|}{C}}OCH_3, —(CH_2)_3S(CH_2)_2\overset{O}{\overset{\|}{C}}H, \text{ and}$$

$$—(CH_2)_3SCH_2—\overset{O}{\overset{\|}{C}}—CH_3.$$

Examples of suitable sulfur containing silicon compounds are silanes such as 3-mercaptopropyltrimethoxysilane, 2-mercaptoethyltriethoxysilane, w-mercaptodecyltriethoxysilane, w-mercaptohexyltripropoxysilane, w-mercaptoamyltriethoxysilane, 2-(triethoxysilyl)ethyl butyl thioether, 3-(trimethoxysilyl)propyl butyl thioether, 4-(triethoxysilyl)butyl methyl thioether, 2-(tripropoxysilyl)ethyl methyl thioether, 2-(tributoxysilyl)ethyl phenyl thioether, 2-(triethoxysilyl) ethyl dodecyl thioether, 6-(trimethoxysilyl)hexyl ethyl thioether.

Suitable examples of disiloxanes which may be employed in this invention are hexamethyldisiloxane, hexaethyldisiloxane, hexapropyldisiloxane, hexaheptyldisiloxane and hexaoctyldisiloxane, with the preferred disiloxane being hexamethyldisiloxane.

The polysiloxane polymers of this invention are prepared by affecting a reaction between a disiloxane and a sulfur containing silicon compound in the presence of an acid catalyst.

Catalyst which may be employed in affecting the reaction are acid clays and organic and inorganic acids having a pKa value less than 1.0 and more preferably below 0.7 in aqueous solutions. Suitable acid catalysts which may be employed are benzosulfonic acid, p-toluenesulfonic acid, sulfuric acid, sulfurous acid, nitric acid, perchloric acid, hydrochloric acid and acid clays such as Filtrol No. 13 and No. 24 (available from Filtrol Corporation).

Although the amount of catalyst is not critical, it is preferred that from about 0.003 percent up to about 10 percent by weight of catalyst based on the total weight of the reactants, i.e., the sulfur containing silicon compound and disiloxane, be employed in the reaction to make the polysiloxane polymers of this invention. Greater amounts of catalyst may be used, however, it is the intent of this invention to provide a catalyst system which does not alter the functionality of the resultant composition.

Generally, it is desirable to remove or destroy the catalysts after the reaction is complete because their presence will adversely affect the properties of the resulting polymer. The catalysts may be removed, for example, by washing with water or they may be destroyed by neutralizing with basic reagents. In addition, certain catalysts, for example, acid clays, may be removed by filtering the reaction mixture.

The ratio of disiloxane to sulfur containing silicon compound is not critical and may range from 0.01 to 6.7 mols of disiloxane per mol of sulfur containing silicon compound and more preferably from 0.5 to 1.5 mols of disiloxane per mol of sulfur containing silicon compound.

The reactions may be conducted at any temperature ranging from about 25° up to about 200° C. over a period of time ranging from 0.5 hour up to several days.

The reaction may be conducted in the absence of a solvent; however, when a solvent is employed, it may be employed in an amount of from about 1 to 50 percent by weight based on the disiloxane and sulfur containing silicon compound. Examples of suitable hydrocarbon solvents are heptane, benzene, toluene, xylene and the like. Moreover, it is preferred that the reaction be conducted in an inert atmosphere.

The polysiloxane polymers of this invention which are free of "D" (R₂SiO) units are useful as cross-linking agents in free radical polymerizations such as those which utilize ultra violet light and a photo initiator. These polymers are also more compatible with organic compounds than polysiloxanes used heretofore, while retaining some of the advantages of the silicon compounds. Moreover, these polymers may be used as intermediates in the formation of polysiloxanes containing "D" (R₂SiiO) units by reacting the polysiloxane polymers of this invention with the more readily available cyclic siloxanes, such as octaorganocyclotetrasiloxanes.

Various embodiments of this invention are illustrated in the following examples in which all parts are by weight unless otherwise specified.

EXAMPLE 1

To a one liter reaction vessel is added 243 parts of hexamethyldisiloxane, 196 parts of 3-mercaptopropyltrimethoxysilane, 196 parts of water, 100 parts of heptane and 5 parts of Filtrol No. 13 acid clay (available from Filtrol Corporation). The vessel is heated to 80° C. and maintained at this temperature for three hours. The contents of the vessel are then cooled to room temperature and filtered. The volatiles are removed by heating for 2 hours at 150° C. at less than 1 torr. A clear, transparent liquid is obtained having a viscosity of 871 cs. at 25° C. Nuclear Magnetic Resonance (NMR) analysis shows that the product has a mol ratio of HSC₃H₆:Si(CH₃)₃ of 1.0:0.81. The SH content of the product is about 14.4 percent.

EXAMPLE 2

The procedure of Example 1 is repeated except that 121.5 parts of hexamethyldisiloxane and 10 parts of Filtrol No. 13 acid clay are used. A turbid fluid is obtained having a viscosity of 740 cs. at 25° C. and an SH content of 19.7 percent. Nuclear Magnetic Resonance (NMR) analysis shows that the product has a mol ratio of $HSC_3H_6:Si(CH_3)_3$ of 1.0:0.92.

EXAMPLE 3

The procedure of Example 1 is repeated, except that 15 parts of hydrochloric acid (37%) is substituted for Filtrol No. 13 acid clay. The reaction mixture is neutralized with 50 parts of sodium bicarbonate, filtered and the volatiles removed by heating under reduced pressure for 2 hours at 150° C. A turbid liquid is recovered and analyzed by Nuclear Magnetic Resonance (NMR). The resultant product has a viscosity of 432.8 cs. at 25° C., an SH content of 20.9 percent and a mol ratio of $HSC_3H_6:Si(CH_3)_3$ of 1.0:0.81.

EXAMPLE 4

The procedure of Example 3 is repeated, except that 5 parts of sulfuric acid (96%) is substituted for the hydrochloric acid. The resultant product has a viscosity of 1,361 cs. at 25° C., an SH content of 16.6 percent and a mol ratio of $HSC_3H_6:Si(CH_3)_3$ of 1.0.:1.33.

What is claimed is:

1. A process for preparing polysiloxane polymers which contain only $(M)_x(T')_y$ structural units in which M is a unit of the formula $R_3SiO_{0.5}$ and T' represents a unit of the formula $(R''S)_zR'SiO_{1.5}$ which comprises reacting a hexaorganodisiloxane with a silicon compound of the formula $$[(R''S)_z R'Si\ OR_3](R''S)_z R'Si(OR)_3$$

in the presence of an acid catalyst having a pKa value less than 1.0, in which R is selected from the group consisting of monovalent hydrocarbon radicals and halogenated monovalent hydrocarbon radicals, R' is selected from the group consisting of divalent, trivalent and tetravalent hydrocarbon radicals having from 2 to 18 carbon atoms and divalent, trivalent and tetravalent hydrocarbon radicals having at least one —C—S—C— group, R'' is selected from the group consisting of hydrogen, and R, x and y are each greater than 1 and up to 20,000, where the ratio of x to y may vary from 1:0.33 to 0.005:1 and z is 1, 2 or 3.

2. The process of claim 1, wherein the hexaorganodisiloxane is a hexaalkyldisiloxane.

3. The process of claim 2, wherein the hexaalkyldisiloxane is hexamethyldisiloxane.

4. The process of claim 1, wherein R is an alkyl radical and R' is a divalent radical.

5. The process of claim 1, wherein R'' is hydrogen.

6. The process of claim 1, wherein R'' is a monovalent hydrocarbon radical.

7. The process of claims 5 or 6, wherein z is 1.

8. The product prepared in accordance with the process of claim 1.

* * * * *

UNITED STATES PATENT AND TRADEMARK OFFICE
CERTIFICATE OF CORRECTION

PATENT NO. : 4,289,867
DATED : September 15, 1981
INVENTOR(S) : Eugene Ray Martin It is certified that error appears in the above-identified patent and that said Letters Patent are hereby corrected as shown below:

Column 6, line 5, the formula in claim 1 should read as follows:

$$(R''S)_z R'Si(OR)_3$$

Signed and Sealed this

Twenty-seventh Day of December 1983

[SEAL]

Attest:

Attesting Officer

GERALD J. MOSSINGHOFF

*Commissioner of Patents and Trademarks*